United States Patent

Kelly et al.

[15] 3,647,222

[45] Mar. 7, 1972

[54] ORIENTATION INDEPENDENT PHONOGRAPH

[72] Inventors: Jack L. Kelly, Bethel Park, Pa.; Ronald K. Wiandt, Decatur, Ill.

[73] Assignee: General Electric Company

[22] Filed: Jan. 6, 1969

[21] Appl. No.: 789,247

[52] U.S. Cl. ....................274/1 R

[51] Int. Cl. ....................G11b

[58] Field of Search ....................274/1, 15, 9, 2, 23, 10

[56] References Cited

UNITED STATES PATENTS

| | | | |
|---|---|---|---|
| 2,776,144 | 1/1957 | Nichols | 274/23 |
| 3,386,741 | 6/1968 | Kingsbury | 274/9 |
| 2,506,692 | 5/1950 | Thompson | 274/23 |

*Primary Examiner*—Harry N. Haroian
*Attorney*—W. Joseph Shanley, Frank L. Neuhauser and Oscar B. Waddell

[57] ABSTRACT

In a miniature record player for reproducing diminutive records, there is provided a rotatable turntable and a pivoted tone arm. A pickup cartridge is mounted on the tone arm for playing records positioned on the turntable. The tone arm is counterbalanced and spring biased so that the pickup cartridge is resiliently urged into playing engagement with a record propelled by the turntable. A peripheral bearing surface is provided on the turntable to enable the turntable to maintain vertical stability when the player is inverted. One or more other bearing surfaces are also provided for maintaining vertical stability of a record placed on the turntable when the player is inverted. With this simplified arrangement, the miniature record player of the present invention may readily play records independently of its orientation.

3 Claims, 14 Drawing Figures

INVENTORS:
JACK L. KELLY,
RONALD K. WIANDT,
BY Thomas A. Briody
THEIR ATTORNEY.

INVENTORS:
JACK L. KELLY,
RONALD K. WIANDT,

BY Thomas A. Briody
THEIR ATTORNEY.

INVENTORS:
JACK L. KELLY,
RONALD K. WIANDT,

BY Thomas A. Briody
THEIR ATTORNEY.

INVENTORS:
JACK L. KELLY,
RONALD K. WIANDT,
BY Thomas A. Briody
THEIR ATTORNEY.

ORIENTATION INDEPENDENT PHONOGRAPH

This invention relates to portable phonograph devices, and more particularly to a compact, diminutive and simplified portable phonograph device which readily lends itself to the playing of small disc-type records.

Miniaturization of consumer electronics devices has become recognized as an extremely important basis for product improvement, especially where such devices are designed for use by teenagers. One such popular device is the phonograph which is presently marketed for playing small vinyl type records that have an external diameter of approximately 4 inches. It is highly desirable that a phonograph device for playing these records should be specially designed so that not only does it afford maximum operational conveniences, but also its overall style and configuration is particularly compatible with, and tailored to the size of the 4-inch record. Such a phonograph device may be readily carried about, from one place to another, by children (e.g., teenagers), and it occupies a relatively small place on a table or other suitable support, in the room of a home wherein it is commonly utilized.

Accordingly, it is an important object of the present invention to provide an improved, compact and portable phonograph device.

It is another object of this invention to provide an improved portable phonograph device, which is constructed in such a manner that it is extremely diminutive in size and can be played in any position.

It is a further object of this invention to provide an improved portable phonograph device which readily lends itself to the playing of records having a very small external diameter, such as records having an overall diameter of less than 4 inches.

It is still another object of this invention to provide an improved portable phonograph device which is very efficient in operation, and yet comprises a minimum number of parts.

A further object of the present invention is to obtain an improved portable phonograph device which includes a novel structure for enabling the device to be played in any orientation (e.g., when placed upside down).

In carrying out the present invention, in one form thereof, there is provided a portable phonograph device which includes a motor driven turntable, and a bifurcated tone arm having a cartridge at the free end of one of its parts for reproducing sound from a diminutive record placed upon the upper surface of the turntable. The tone arm is counterbalanced and spring biased so that the cartridge is resiliently urged into playing engagement with a record propelled by the turntable. Bearing surfaces are provided for maintaining vertical stability of the turntable and records placed thereon, when the device is inverted. With such a simplified arrangement, the device may be played in any orientation (e.g., when placed upside down).

By further aspects of the present invention, additional desirable features may be included in the phonograph device, and the specification concludes with claims particularly pointing out and distinctly claiming the subject matter which we regard as our invention. The invention, however, as to organization and method of operation, together with further objects and advantages thereof, may best be understood by reference to the following description, when taken in conjunction with the accompanying drawings in which:

Figure 12:
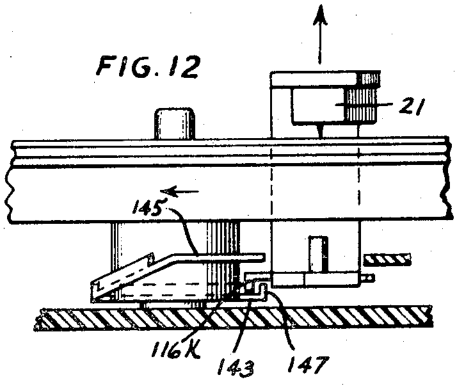
FIG. 12 is a fragmentary view showing the bottom part of the tone arm with its velocity trip slider, just at the point where the slider initially engages the ramp element of the turntable for changing the vertical position of the tone arm from its inner "played" position toward its outer "starting" position.
Figure 13:
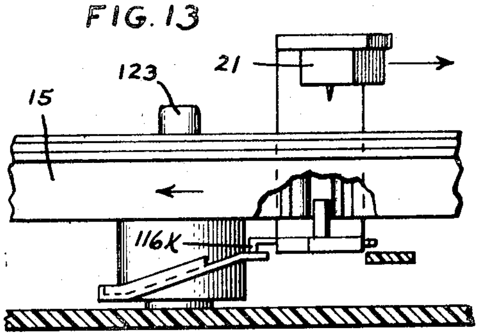
Figure 14:
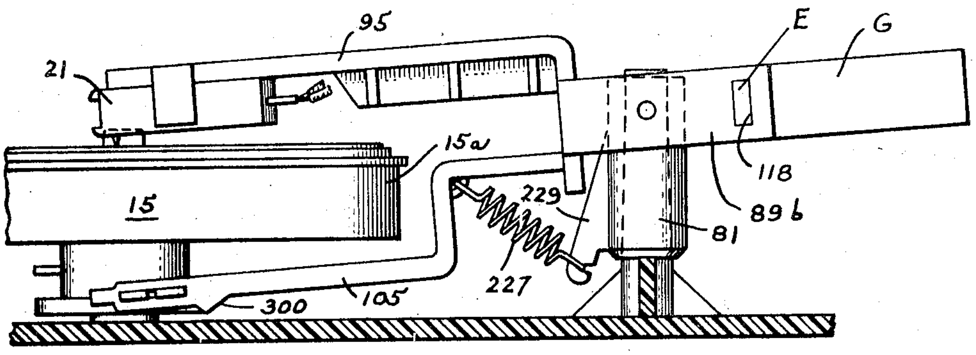

FIG. 13 is a view similar to that of FIG. 12, but showing the tone arm after it has completed its upward movement at the inner groove of the record, in consonance with camming action of the ramp element exerted upon the velocity trip slider; and FIG. 14 is a fragmentary, side elevation view showing the pickup cartridge spring biased into operational engagement with a record placed on the turntable.

Figures 1, 4, 5, 6, 7:
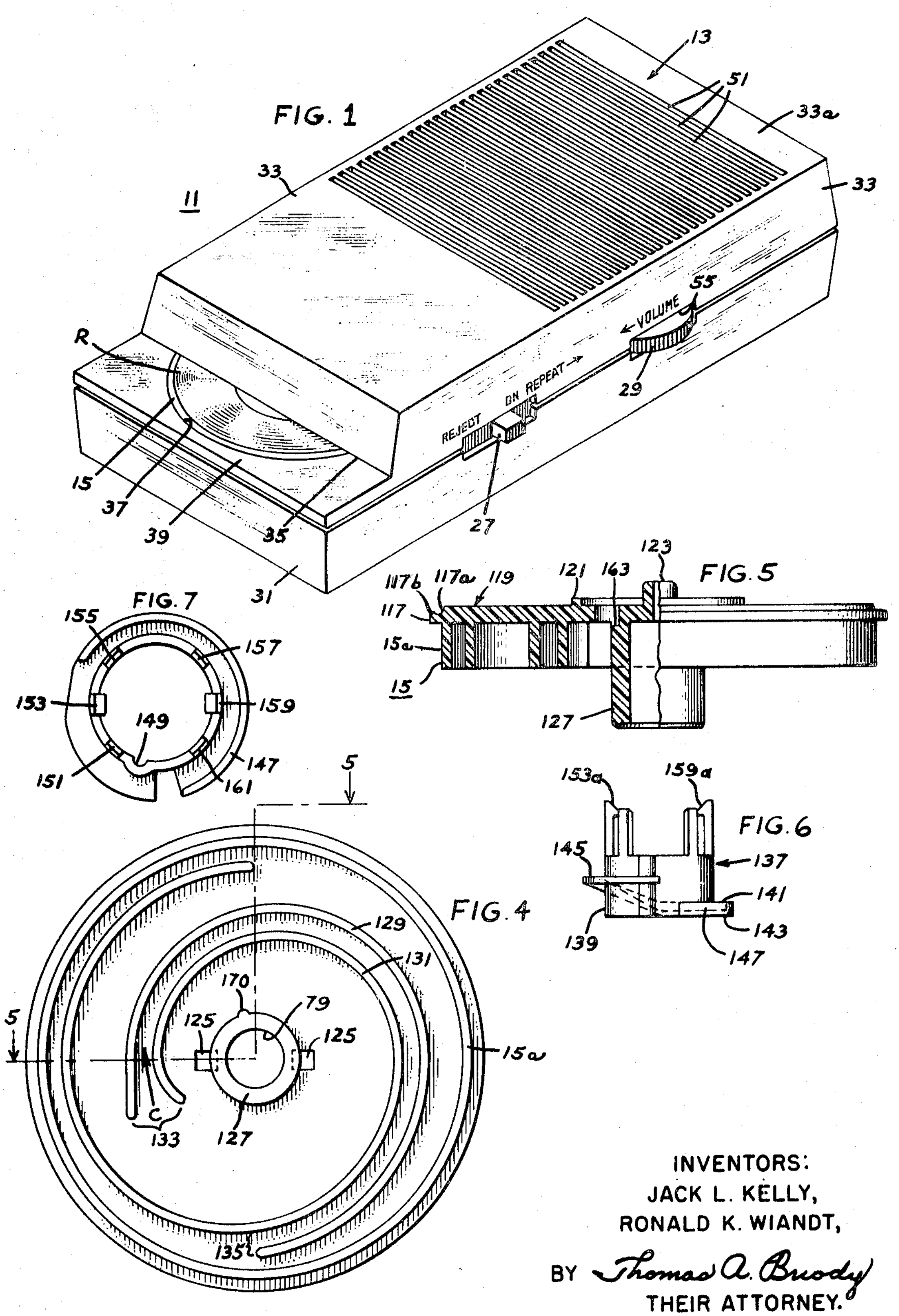
FIG. 1 is a perspective view of a "mini disc" phonograph device embodying the present invention, in one form thereof.
FIG. 4 is a bottom view of the upper portion of the turntable assembly for the phonograph device.
FIG. 5 is a side elevation view of the upper portion of the turntable, partially in full and partially in section, as taken along the lines 5—5 of FIG. 4.
FIG. 6 is a side elevation view of the ramp element which is exploded downwardly from the position it would assume for assembled cooperation with the upper portion of the turntable of FIG. 5.
FIG. 7 is a top view of the ramp element shown in FIG. 6.
Figure 2:
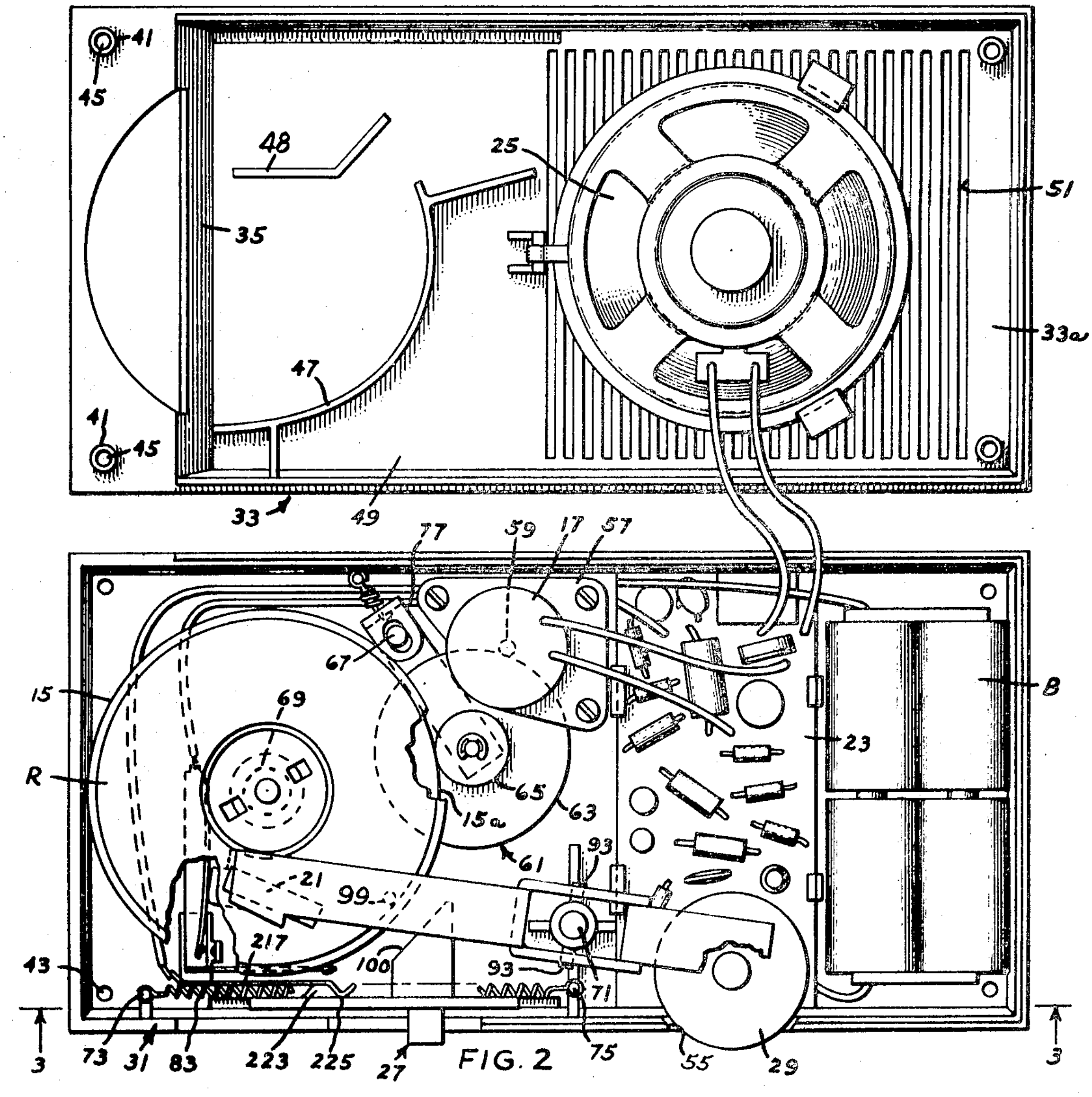
FIG. 2 is a partially exploded view showing the bottom of the cover assembly of the phonograph device and the top of the base assembly thereof, so that the various parts located in these assemblies, may be seen.

Referring now in detail to the drawings, and in particular to FIGS. 1 and 2 thereof, there is shown a small portable phonograph device 11 embodying one form of our invention. The phonograph device 11 essentially comprises a housing 13 wherein the turntable 15 and its driving motor 17 (FIG. 2) are located, tone arm 19 and its associated playback head 21, amplifier 23, speaker 25, sliding control element 27, for selecting "on", "off", "reject", and "repeat" play for the unit, and rotatable volume controlling disc 29. The sliding control element 27 may thus be manually operated from left to right (viewing FIG. 1) to control the type of operation of a record R placed on turntable 15, with the disc 29 being rotated for adjustment of the most desirable playback volume. A plurality of batteries B (FIG. 2) are also supplied to serve as a direct current power source for the device 11.

Figure 3:
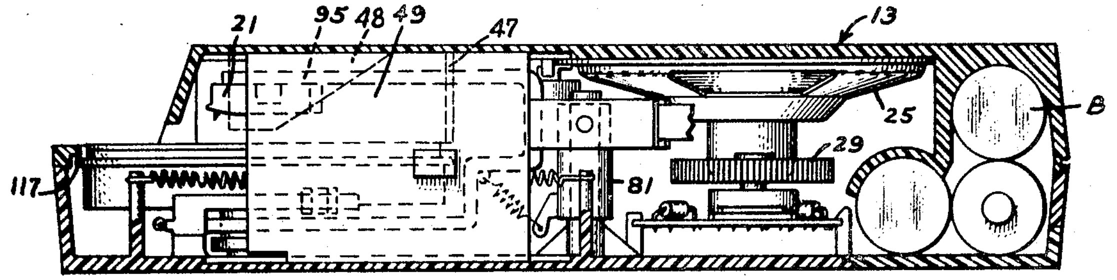
FIG. 3 is a section view of the complete phonograph device taken generally along the lines 3—3 of FIG. 2.

Turning now to a more detailed description of the device 11 embodying the present invention, attention is further directed to FIGS. 1, 2, and 3. As shown therein, the housing 13 has a generally L-shaped profile, provided by the complementary cooperation of an oblong shaped casing bottom 31 and an oblong-shaped casing top 33, the latter having an L-shaped profile. The top 33 of housing 13 is recessed, and has a stepped front portion 35 with an arc shaped opening 37 in the floor 39 thereof. The stepped front portion 35 of casing top 33 overlies the upper front end of casing bottom 31.

The oblong shaped casing top 33 of the housing 13 has a plurality of posts 41 (FIG. 2) formed therein. Posts 41 extend downwardly therefrom (when the housing parts are assembled as shown in FIG. 1) for receipt of screws (not shown) which are utilized for attachment of the top 33 into mating complementary engagement with bottom 31. Such screws may thus be extended upwardly through apertures 43 of the casing bottom 31 (FIG. 2) for threaded engagement with the apertures 45 of posts 41.

Top 33 of the housing 13 also includes an arc shaped depending rib 47 (FIG. 2) which projects downwardly from the horizontal top surface 49 of casing top 33. The rib 47 extends rearwardly, in arcuate fashion, from stepped front portion 35 in the recessed cavity 49 (FIG. 3) of top 33. Since rib 47 is disposed in generally parallel spaced apart contiguity with relation to the main outer periphery 15*a* of turntable 15, when a record R is placed on the turntable 15, it may be readily guided into concentric alignment with the turntable surface by engagement of the peripheral edge of the record disc R with the arc shaped rib 47.

The recessed bottom of top 33 of housing 13 also has secured thereto the loudspeaker 25 (FIG. 2). To allow sound to readily emanate from loudspeaker 25, a series of elongated parallel cutout apertures 51 are formed in attractive fashion in top wall 33*a* of the top 33, above the speaker 25 (i.e., near the right side of top wall 33*a*, viewing FIG. 2).

Turning now to the other portion of the housing 13, casing bottom 31 is also recessed, and it has mounted therein a plurality of DC batteries B, as shown on the right side of FIG. 2, which serve as a power source for energizing the turntable motor 17. Next to the batteries, there is located the amplifier 23, with the volume control disc 29 mounted near one end thereof so that a portion of disc 29 projects outwardly through a slot 55 in the housing wall for easy manipulation by an operator.

Figures 8, 9, 10:
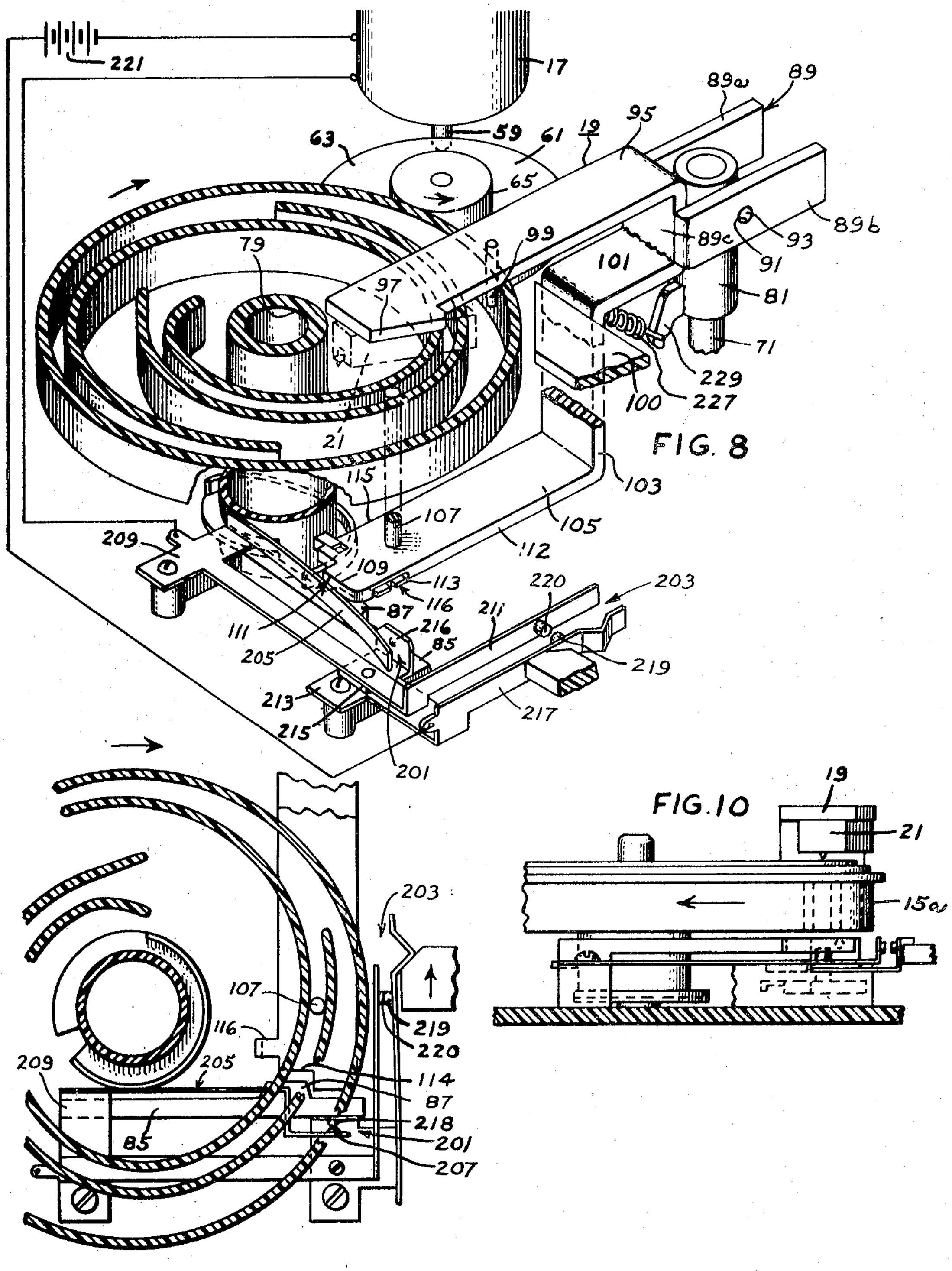
FIG. 8 is a schematic, fragmentary and partially exploded view of the device to show the mode of cooperation between the tone arm and the turntable, and the manner whereby the controlling switches are actuated by means of movement of the turntable and the tone arm.
FIG. 9 is a fragmentary plan view similar to that of FIG. 8, but with the upper portion of the tone arm cutaway and showing the contacts of the two control switches in their closed positions.
FIG. 10 is a side elevation view of a portion of the turntable and the tone arm shown in FIG. 8, the cartridge and the tone arm being in initial playing cooperation with a record on the turntable.
Figure 11:
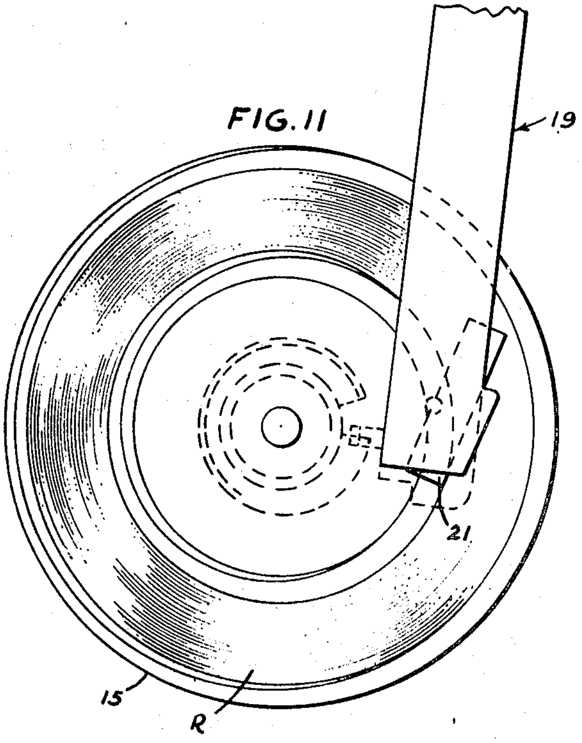
FIG. 11 is a fragmentary plan view of the device showing the cartridge and the tone arm in playing engagement with the fast inner groove of a record located on the turntable.

For supporting motor 17, near the opposite side of casing bottom 31 from actuator 27, there is secured a horizontal supporting bracket 57. The motor 17 is inverted on bracket 57 so that it provides a depending shouldered shaft 59 which is arranged to drive the turntable 15. More particularly, as shown in FIGS. 2 and 8, the depending shaft 59 of motor 17 is disposed at the same vertical level as idler wheel 61. The idler wheel 61 includes a large diameter wheel portion 63 which is driven by motor shaft 59, and a smaller diameter wheel portion 65, which drivingly engages the main external periphery 15*a* of turntable 15. The idler wheel 61 is spring biased into concurrent interengagement with motor shaft 59 and the turntable periphery 15*a* so that the small wheel portion 65 of the idler wheel rotates in the direction shown by the arrow in FIG. 8, to drive the turntable 15 in the direction also shown by the related arrow in FIG. 8.

On the left side of the recessed bottom 31 of the housing 13, there are formed a plurality of posts 67, 69, 71, 73, and 75. Post 67 extends perpendicularly upwardly from the floor of bottom 31, and provides a pivotal support for the spring biased lever 77 which in turn pivotally supports idler wheel 61. The post 69 also extends upwardly from the floor of bottom 31, and provides a bearing surface for bore 79 (FIG. 8) formed in the bottom of the turntable 15, to facilitate the rotative movement of turntable 15 in response to the energization of motor 17.

Post 71 extends upwardly and perpendicularly from the floor of casing bottom 31, near the volume controlling disc 29, for rotatably receiving a plastic bearing bushing 81 (FIGS. 2 and 3) upon which the bifurcated tone arm 19 is arranged. Further aspects of the structure of the tone arm bearing bushing will be set forth hereinafter.

Posts 73 and 75 are each disposed near one side of the casing bottom 31, as illustrated in FIG. 2 for receipt of each end of a tension spring 83, which helps control the operative movement and positioning of the sliding control element 27.

It should be further noted that near the left side of the bottom casing member 31, (viewing FIG. 9) there is located a transverse rib 85. Rib 85 extends transversely across casing bottom 31 near one of its ends at a uniform height (as shown in FIG. 8), and it has a supporting surface 87 formed thereon and projecting from one side thereof. Rib 85 and its surface 87 serve to help control vertical movement of the free end of the tone arm 19 during lateral movement of the tone arm from the fast inner-groove of a record back to its initial or "repeat play" positions.

Turning now to the construction of the tone arm 19 of our invention, attention is directed to FIGS. 2 and 8. As shown therein, the tone arm 19 includes a U-shaped supporting end 89 having a pair of opposed shoulders 89*a* and 89*b*. The shoulders 89*a* and 89*b* have a pair of aligned apertures 91 formed respectively therein for close toleranced receipt of a pair of opposed cylindrical projecting ears 93 (FIG. 2) which extend laterally outwardly from the plastic bushing 81. It will thus be understood by those skilled in the art that the ears 93 of bushing 81 rotatably support shoulders 89*a* and 89*b* of the tone arm 19 to enable it to pivot in a vertical direction about a horizontal axis. Bushing 81 is free to rotate about its supporting stud 71 to enable the tone arm 19 supported thereby to rotate horizontally about a vertical axis.

The U-shaped supporting end 89 of tone arm 19 also includes a bight portion 89*c* (FIG. 8) which extends in a generally vertical direction. The upper end of bight 89*c* of the supporting end of the tone arm is connected to a horizontally disposed and cantilevered upper tone arm portion 95. Portion 95 of the tone arm, thus extends from the top of bight 89*c* of the tone arm in generally parallel relationship to the floor of the casing bottom 31, and it has an inclined shoulder 97 formed thereon near its free end, on one side thereof (see FIG. 8). At the free end of the upper tone arm portion 95, on its underside, there is formed a suitable fastening means for removably snapping the cartridge 21 into engagement with the tone arm.

To help manually operate the tone arm 19 in response to movement of sliding control element 27, there is also provided on the upper tone arm portion 95, a depending pin 99. Pin 99, is of cylindrical configuration and extends downwardly from the upper tone arm portion between its supported and free ends. The pin 99 is engaged by a camming surface 100 (FIG. 2) of the control actuator 27, to help move the tone arm 19 transversely toward the center of the turntable when it is desired to reject a record.

The bottom of the bight 89*c* of the U-shaped supporting end of the tone arm is connected to a lower step 101 (FIG. 8), which is in turn connected via vertical section 103 to the lower tone arm portion 105. The lower tone arm portion 105 is disposed horizontally, in parallel and generally underlying relationship with respect to upper tone arm portion 95.

For enabling the tone arm 19 to be effectively cammed into "replay" or "return" cycle by cooperation with the turntable 15 after the completion of play of each record, or the initiation of the actuator 27 to reject, there is formed on the lower tone arm portion 105, near its free end, an upwardly facing stud-like projection 107, a camming extension 111, and a transverse slot 113. The studlike projection 107 of lower tone arm portion 105 is disposed near the camming extension 111, but is spaced therefrom toward vertical section 103. As will be set forth in greater detail hereinafter, projection 107 cooperates with a guiding means on the underside of the turntable to help control return movement of the tone arm after a record has been played. Camming extension 111 protrudes longitudinally from the free end of tone arm lower portion 105 and is disposed laterally on one longitudinal side thereof near edge 112. As further shown in FIG. 9, there is a cutout corner portion 114 of the free end of the tone arm lower portion 105 near the other longitudinal edge 115. The purpose of camming extension 111 is to help control energization of the motor in response to the angular disposition of the tone arm, as shall be set forth in further detail hereinafter.

As best shown in FIG. 8, the transverse slot 113 extends from longitudinal edge 115 through to edge 112 (FIG. 8). This slot is structured to receive a bifurcated velocity trip element 116 which is slidably supported therein.

The structure of the velocity trip element 116 and its mode of cooperation with tone arm 19, is disclosed and claimed in another application, Ser. No. 789,174, filed concurrently herewith by the same inventors and assigned to the same assignee.

Turning now to an important aspect of the present invention, which concerns an improved structure of a phonograph that enables it to play effectively in any position, attention is now directed to FIG. 5. As shown therein, the turntable 15 includes an annular bead portion 117 which projects radially outwardly from the main periphery 15*a* of the turntable.

In accordance with the present invention, the annular bead portion 117 is recessed downwardly from the upper horizontal surface 119 of the turntable. As shown most clearly in FIG. 5, there is thus provided a peripheral cutout portion or annular groove 117*a* which extends from the horizontal surface 119 to a radiused upwardly facing peripheral lip 117*b*. The lip 117*b* faces upwardly and is annular, so that it may extend contiguously underneath the arc shaped opening 37 of floor 39 of the housing, as shown in FIG. 3, to serve as a bearing surface for vertically stabilizing the position of the rotating turntable 15, if the device 11 is inverted while a record is being played. It is further contemplated by the present invention that the lip 117*b* is in underlying contiguity to the arc shaped rib 47 (FIG. 3) so that lip 117*b* also provides a bearing surface thereagainst. It will thus be understood by those skilled in the art that, if device 11 is inverted while a record is being played therein, the lip 117*b* of turntable 15 assumes a linear and annular type of bearing relationship with the adjacent underside of arc shaped opening 37 and arc shaped rib 47. This helps maintain the rotating turntable 15 in effective playing operation when the device 11 is upside down.

In addition to the bearing lip 117*b* of the turntable there is also provided a suitable depending rib structure 48 (FIG. 2) which extends downwardly from top portion 33 of the housing. This depending rib structure is in overlying contiguity (FIG. 3) to a record R placed on the surface of turntable 15, (i.e., when the device 11 is in its normal erect position). Coupled with the biasing force of cartridge 21 exerted on a record, this rib structure helps to maintain record R in the desired vertical stability when the device 11 is inverted during a playing cycle.

As further shown in FIG. 8, the tone arm 19 is biased downwardly toward turntable 15 by means of a spring 227 which runs in tension between the inside corner of tone arm 19 where the lower step 101 is connected to vertical section 103, and a hook 229 formed integrally to the plastic bearing bushing 81. As a result of the tensional force imparted to the tone arm by spring 227, the stylus of cartridge 21 is normally and positively biased into engagement with a record R placed on the turntable 15.

For counterbalancing the tone arm 19, in further accord with the present invention, there is secured between the parted shoulders 89*a* and 89*b* of the tone arm 19, a counterweight G (FIG. 14). Counterweight G has a pair of opposed ears E formed near one of its ends, which snap into cooperation with mating slots 118 of the shoulders 89*a*, 89*b*.

As a result of the coaction of bearing surfaces 117*b*, the depending rib structure contiguous to the record R, the action of spring 227, and the counterbalance G, the phonograph device 11 has been found to play effectively regardless of the gravitational orientation of the device 11. For example, when the device 11 has been placed upside down, it has played a record effectively.

On the upper horizontal surface 119 of the turntable there may be positioned a rubber mat (not shown) for receiving a record. Also formed on the upper surface 119 of the turntable 15, is an annular rib 121 within the confines of which there is located a concentric integral spindle 123, and a pair of radial slots 125 (FIG. 4). The slots 125 extend vertically through the surface 119 of the turntable (as shown in FIG. 4) and are located adjacent the integral spindle 123.

On the underside of the turntable 15, there is provided an integral cylindrical hub 127, and a pair of spaced apart spirally extensive ribs 129 and 131. The ribs 129 and 131 extend downwardly, for a uniform depth, from the bottom of the turntable 15 to provide a controlling channel C (shown best in FIG. 4) for cooperation with pin 107 of the lower tone arm portion 105 between the mouth 133 and an exit 135. It will be further noted that rib 131 is disposed closer to the axis of rotation of the turntable than is rib 129, and rib 131 is also longer than rib 129. Thus, rib 131 continues on from mouth 133 past exit 135 to provide a secondary channel area between rib 131 and the inside of turntable wall 15*a*. This helps assure that after the pin 107 has passed through exit 135 it will continue to be guided adjacent the outer periphery of the turntable, inside of the periphery wall 115*a* of the turntable.

Considering further FIGS. 5 and 6, it will be noted that in device 11 there is provided a specially configured ramp element 137. The purpose of element 137 is to cooperate with turntable 15, for camming the tone arm 19 up off a record after the cartridge 21 has reached the fast inner-groove of a record. The ramp element 137, as shown in FIGS. 6 and 7, comprises an annular hub 139 with a spirally configured ramp 141 extending upwardly at its periphery from bottom 143 to the top level 145. The spiral ramp 141 has an upstanding lip 147 formed thereon at its outer edge for approximately 200° of its peripheral distance. The purpose of lip 147 is to help maintain the free end 116*k* of the velocity trip element 116 on the ramp 141 during a desired portion of the cycling of the tone arm upwardly toward its starting position after a record has been played.

For convenient attachment of ramp element 137 to the turntable 15 at the desired relative annular orientation, there is also formed on annular hub 139 of the ramp element 137, an axially extensive groove 149 (FIG. 7), and a series of axially extensive fingers 151, 153, 155, 157, 159 and 161. The fingers 151, 155, 157, and 161 are all of the same length, and the purpose of these fingers is to help provide lateral support for the alignment of the ramp element 137 with hub 127 of the turntable 15. The free ends of the fingers 151, 155, 157, and 161 serve as positioning stops for engagement with the bottom wall of the turntable 15. As further shown in FIG. 6, the remaining two fingers 153, and 159 of ramp element 137, in addition to being longer than the other fingers, are disposed in opposition and include hooks 153*a* and 159*a* at their free ends. These fingers enter slots 125 of the turntable 15 and the hooked ends thereof cooperate with shoulders 163 of these slots (FIG. 5), for resiliently securing the ramp element 137 to the turntable 15.

To readily and positively ascertain the desired angular relationship of ramp element 137 with turntable 127 at the time of connection of these elements together, the hub 127 has an axially extensive rib 170 which protrudes from it periphery. Rib 170 cooperates with groove 149 to provide accurate angular orientation of these two elements.

As further shown in FIGS. 2 and 8–10, our improved phonograph device 11 includes a pair of parallel connected switches 201 and 203. These switches are shown in the closed position in FIG. 9, and in the open position in FIG. 8. The switch 201 comprises a movable contact element 205 which has its edge in generally edgewise relationship with transverse rib 85 and is disposed in generally parallel relationship with respect to the direction of rib 85. Movable contact element 205 has a movable contact 207 (FIG. 9), formed at its free end. The supported end of movable contact arm 205 is connected to terminal 209 which in turn is connected to a contact supporting arm 211 of switch 203. Contact supporting arm 211 is slightly flexible, but it also functions as the relatively stationary contact of switch 203. As further shown in FIG. 8, the terminal 209 is bent over at the end thereof closest to contact supporting arm 211 so that the contact supporting arm 211 is generally perpendicular to movable contact arm 205, but also disposed in edgewise relationship with respect to the bottom surface of the casing 13. Directly underneath the terminal 209 of switch 201, and in insulated relationship with respect thereto, is a terminal 213 (FIG. 8). Terminal 213 is thus mechanically connected to terminal 209, but electrically insulated therefrom by spacer 215. Terminal 213 includes a supporting portion which is turned upwardly at 216 to support a fixed contact 218 for switch 201. Terminal 213 also includes an extension therefrom which is bent over for connection to a movable contact arm 217 of the switch 203. Movable contact arm 217 has a movable contact 219 at its free end which cooperates with the relatively stationary contact 220 contact of contact supporting arm 211, to complete the switch 203.

The switches 201 and 203 are connected in parallel with each other, as shown in FIG. 8, and this parallel connection is connected via terminals 209 and 217 in series with a DC sources 221 and motor 17.

For manually closing switch 203, the slidable actuator 27 has a small cam surface 223 (FIG. 2) formed thereon which acts upon V-shaped end 225 of contact arm 217. Thus, viewing FIG. 2, when actuator 27 moves to the right from the position indicated, end 225 of contact arm 217 operates contact arm 217 upwardly to close switch 203.

Turning now to a description of the operation of our improved portable phonograph device 11, attention is directed to FIG. 1. As shown in FIG. 1, the slidable actuator 27 is in the OFF position. With actuator 27 in this position, the tone arm 19 is in an elevated position (with the cartridge above any record) and it is disposed in an angular position midway between the inner and outer grooves of a record located on turntable 15. The cartridge 21 is then held suspended above the turntable, and the free end 111 of lower tone arm portion 105 rests upon surface 87 of the rib 85 to maintain the tone arm 19 in its elevated position. With the device 11 in OFF position, both of the switches 201 and 203 are open, as shown in FIG. 8. Switch 203 is in its normally open position and switch 201 is held open by engagement of free end 111 of the lower tone arm portion with movable contact arm 205.

For normal playing operation of the device 11, the operator first places a record R on the turntable 15. To do this he pushes the record R into the arc shaped opening of the stepped front portion of the housing. The periphery of record R thereupon impinges on curved rib 47 (FIG. 2) and the center hole (not shown) of the record R is placed upon the integral spindle 123 of the turntable 15. The operator then pushes actuator 27 to the right from its OFF position to its ON position. When this is done, the cam surface 223 of the actuator 27 engages the curved end 225 of movable contact arm 219, and momentarily closes switch 203. Since the switches 201 and 203 are in parallel, this causes the energization of motor 17 from the DC source 221. Spring 83 will return actuator 27 to its OFF position. As the turntable 15 rotates, as indicated in FIG. 9, the pin 107, which is disposed in channel C of the turntable (FIG. 4), is cammed toward the inner periphery 15*a* of turntable 15. This causes the tone arm to move downwardly and to the left from its FIG. 8 position. When the free end 111 of arm 19 moves far enough away from contact arm 205, before surface 87 of rib 85 is reached, switch 201 is allowed to operate to its normally closed position. This takes place before the momentary contacts of switch 203 reopen. As the free end 111 of the tone arm 19, moving toward the right in FIG. 8, passes surface 87 of rib 85 (FIG. 9), the spring 227 (FIG. 8) causes the cartridge 21 to move downwardly toward record R, and the actuating pressure of free end 111, previously exerted upon movable contact arm 205, is released. The stylus of cartridge 21 then impinges on the outermost groove of record R and the cartridge serves as a transducer for converting the mechanical vibrations of the record groove to electrical signals which are amplified for reproduction through speaker 25.

When the stylus of tone arm 19 reaches the fast lead ingroove of the record the follower end 116*k* of the velocity trip element 116 bounces or "kisses" back if it engages the periphery of ramp element 137 before a program is completed. Upon completion of a program, follower end 116*k* enters the bottom of spiral ramp 141 and rides up the ramp 141 from its lower level to its top level 145. When this occurs, the tone arm's cartridge is thus cammed up off of the record R, until pin 107 of the tone arm enters mouth 133 of the spiral shaped channel C. The free end 111 of tone arm 19 then rides along transverse rib 85 of the housing, and the pin 107 of the tone arm is cammed laterally outwardly by channel C of the turntable 15, until the free end 111 of the tone arm 19 engages movable contact arm 205 to open normally closed switch 201. The device is thus returned to its OFF position.

If it is desired by the operator to continuously replay the same record, the slider actuator 27 may be moved further to the right, to the position indicated on the device 11 in FIG. 1. When this movement is accomplished, the actuator 27 is detented to the extreme right from where it is shown in FIG. 2, by engagement of a protruding portion (not shown) of actuator 27 with a recess of the housing (also not shown). This detent arrangement resiliently maintains the slidable actuator to the right (viewing FIG. 2) to hold the normally open contacts of switch 203 in an ON position. Operation of actuator 27 back to the left from its extreme right position overcomes the detent arrangement to allow spring 83 to return actuator 27 to its normal OFF position. Switch 203 is thereupon allowed to return to its normally open position.

If a record R is being played on the device 11 and the operator should desire to REJECT the record or return the device to its OFF condition before completion of play, the slidable actuator 27 is thereupon operated to its extreme left position, from where it is shown in FIG. 1. When this operation is accomplished, a camming surface (not shown) of the actuator 27 engages a small inclined bottom portion 300 (FIG. 14) formed on the underside of the lower tone arm portion 105, to first cam the cartridge 21 a very small distance (e.g., one-sixteenth of an inch) off of record R. After this actuation occurs, the camming surface 100 (FIG. 2) of actuator 27 then engages depending pin 99 on the underside of the upper tone arm portion 95, to cam the tone arm inwardly toward the axis of rotation of the turntable until the velocity trip element reaches ramp 141. The follower 116*k* thereupon enters the bottom of ramp 141 to cycle the tone arm back toward its OFF position.

It will now, therefore, be seen that the present invention is an improved portable phonograph specially adapted for playing diminutive records regardless of the gravitational orientation of the phonograph. It will be further understood that there is provided a novel and advantageous tone arm biasing and mounting structure which is very efficient and flexible.

While in accordance with the Patent Statutes, we have described what at present is considered to be a preferred embodiment of our invention, it will be obvious to those skilled in the art that various changes and modifications may be made therein without departing from this invention, and therefore, we aim in the following claims to cover all such equivalent variations as fall within the true spirit and scope of this invention.

What we claim as new and desire to secure by Letters Patent of the United States is:

1. A phonograph comprising a housing, a driving means, a turntable driven by said driving means, a tone arm pivotally supported in said housing for playing a record placed upon said turntable and driven thereby, a pickup cartridge supported by said tone arm near one end thereof, first vertical bearing means including said turntable and said housing which maintain vertical stability of said turntable with respect to said housing when said phonograph is moved out of a normal erect playing condition, second vertical bearing means including said cartridge, said housing and said record, which maintain vertical stability of said record with respect to said turntable and said housing when said phonograph is moved out of a normal erect playing condition, means for counterbalancing said tone arm about a horizontal axis in said housing, and spring means for continuously urging said cartridge about a horizontal axis toward said record; whereby said first and second bearing means, said counterbalancing means and said spring means act conjointly to enable said device to be played in any position of gravitational orientation.

2. The phonograph of claim 1 wherein said first bearing means includes an annular recessed lip formed on the periphery of the turntable adjacent to its upper surface, said lip being engageable with said housing to provide an annular and linear vertical bearing surface between said turntable and said housing when the axis of rotation of said turntable is disposed in a nonvertical position of orientation.

3. The phonograph of claim 2 wherein said second vertical bearing means includes the cooperative engagement of a stylus of said cartridge with said record, and the cooperative engagement of a depending portion of said housing with said record, said second bearing means coacting with said record when the axis of rotation of said turntable is disposed in a non-vertical position of orientation.

* * * * *